United States Patent Office 2,975,108
Patented Mar. 14, 1961

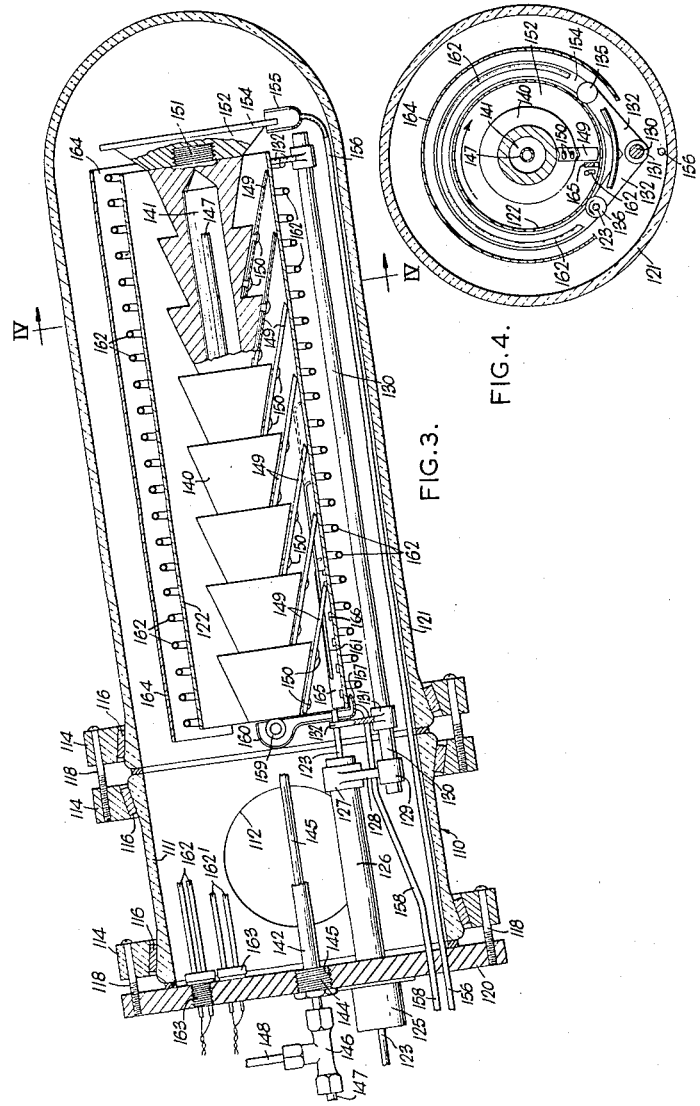

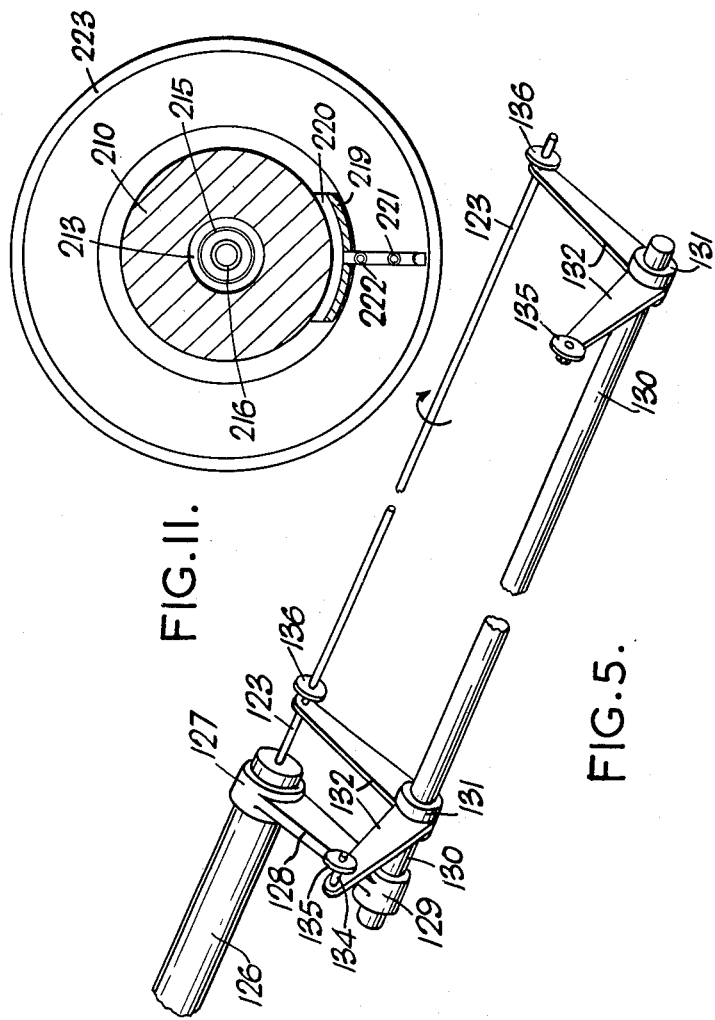

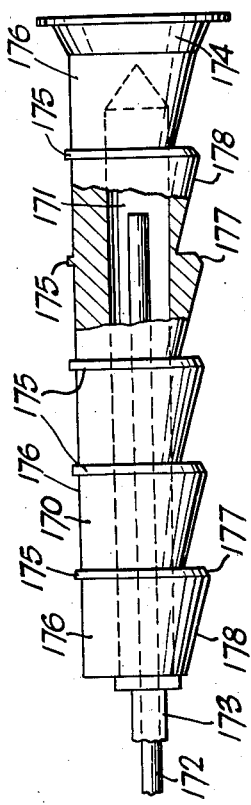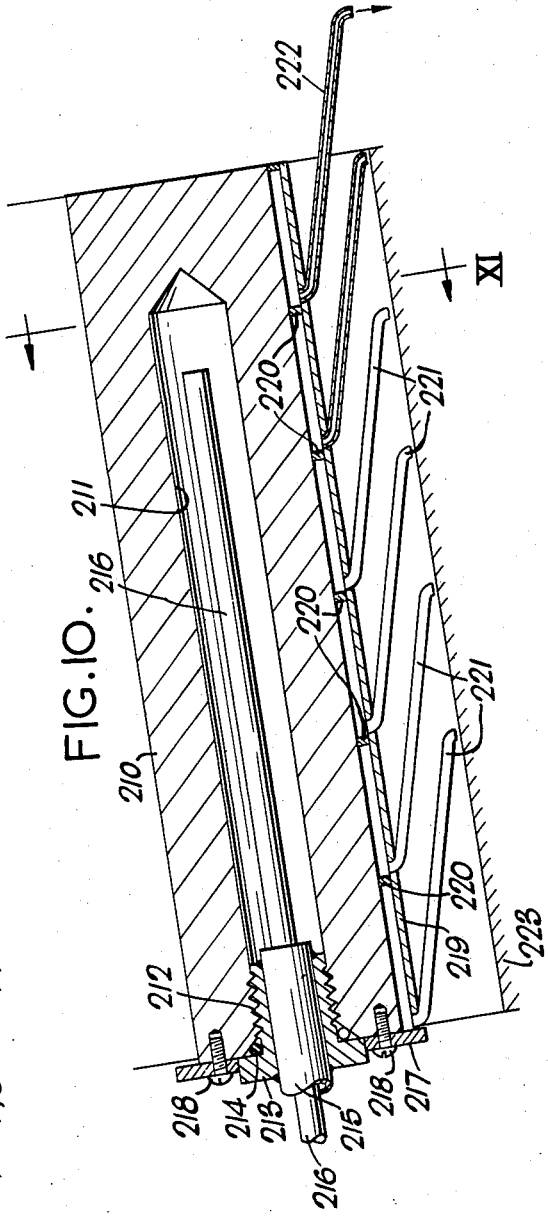

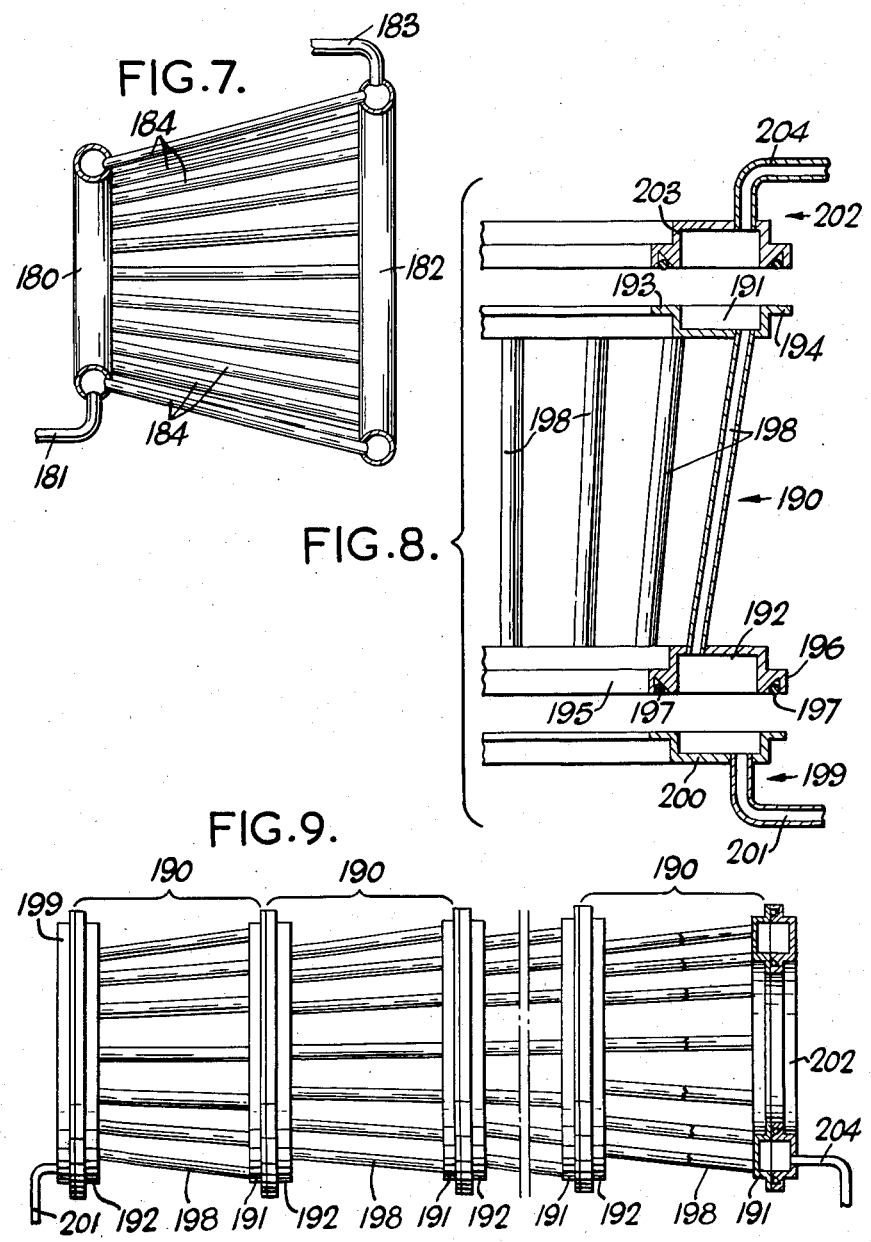

2,975,108

THIN FILM ROTATABLE FRACTIONATION APPARATUS

Peter Ridgway Watt, Crawley, England, assignor to Vitamins Limited, London, England, a British company Filed Nov. 18, 1958, Ser. No. 774,640

Claims priority, application Great Britain Nov. 19, 1957

17 Claims. (Cl. 202—64)

The present invention relates to molecular, high-vacuum and other stills and is particularly, but not exclusively concerned with molecular distillation apparatus which can be used to fractionate materials which are sensitive to heat.

It is often desirable to purify small amounts of heat-sensitive material by distillation and, in many cases, this can be accomplished in a small conventional distillation apparatus, evacuated to an indicated pressure of 0.1–1.0 mm., so that decomposition is minimised. However, some products are particularly thermolabile and may be partly decomposed during distillation, even at the pressure range mentioned. The main reasons for this are as follows:

(1) The bulk of the distilland is usually at a higher temperature than that actually distilling, since it is in a relatively deep container heated from below;

(2) The depth of distilland is such that volatiles in the lower layers cannot readily escape at equilibrium rates;

(3) The pressure at the distilling surface is very much higher than that indicated on the pump vacuum gauge, since there is a big pressure gradient down the flask, column, condenser and connections of the apparatus.

Other distillation apparatus used for such work include the small pot-still, which is, in effect, two concentric test-tubes, the inner being cooled and serving as a condenser, while the material is heated in the outer one. A relatively high vacuum may be maintained in the distilling space and distillation takes place under good conditions, provided there is only a thin layer of distilland in the outer tube. If more than a gram or so is to be distilled, however, the above-mentioned disadvantages (1) and (2) apply. The simple pot-still also has the disadvantages that it is difficult to take fractions and, even if a pig fraction collector is fitted, the still provides only about one-third of a theoretical plate and the separation is rather poor.

Another known kind of apparatus, the falling-film still, overcomes most of the above-mentioned disadvantages, but the charge required is rather large in comparison with most laboratory preparations, normally being from 25 to 200 grams, but fractions can be taken as often as required. It is necessary, however, to wait some considerable time for each fraction to drain off the rather large condenser, if good separation is required. Provided not more than 5% is distilled in one pass over the evaporator, it is possible to attain about 0.9 of a theoretical plate. The falling-film still may be maintained at a much lower pressure than the pot-still, as the pumping ports are considerably larger.

Multi-stage pot-stills are very unsatisfactory, as each stage has all the drawbacks of a pot-still and both thermal hazard and separation are bad. Multi-stage centrifugal stills are known and are very useful, but their construction on the 10 gram scale would be difficult. Similar considerations apply to multi-column falling-film stills.

Consequently, it is an object of the present invention to provide molecular, high-vacuum or other distillation apparatus, which can be constructed as a laboratory scale apparatus capable of distilling a charge in the 3–10 gram range and operated to give a better separation than the pot-still and which is largely or even wholly free of the defects of known apparatus, such as discussed above, and the elaborate fractionating molecular stills already known. It is also an object of the invention to provide a distillation apparatus which can be constructed on a scale suitable for dealing with a charge as low as 2 grams or on a considerably larger scale and which can be adapted for either batch-wise or continuous distillations, in which the afore-mentioned disadvantages are materially reduced or even entirely eliminated.

According to the invention, a distillation apparatus is provided, which comprises, in combination, a rotatable evaporator surface which is symmetrical about its axis of rotation, means for rotating the evaporator surface, means for heating the evaporator surface, a stationary condenser surface disposed within and surrounded by the evaporator surface, the condenser surface comprising at least two sections in the direction of the axis of rotation of the evaporator surface, means for cooling the condenser surface and the axis of rotation of the evaporator surface having an inclination to the horizontal sufficient to cause distillation residue to travel under gravity toward the lower end of the evaporator surface, means being associated with each section of the condenser surface to cause distillate condensed on such section to be delivered under gravity to the region of the evaporator surface adjacent the next higher section of the condenser surface, whereby the distillate is evaporated at least twice and is caused to travel toward the higher end of the evaporator surface.

In one embodiment of the invention, the evaporator surface is formed by a near-horizontal tube having its lower end closed to serve as a receptacle for distilland and the tube being symmetrical about its axis of rotation, rotation of the tube forming a thin film of distilland upon the evaporator surface.

In another embodiment of the invention, the evaporator surface is formed by a near-horizontal tube open at both ends, for effecting distillation on a continuous basis of distilland supplied to the evaporator surface and spread in a thin film thereon by the rotation thereof.

It is preferable for the condenser surface to be constituted by an integral multi-section condenser block. In another construction, the condenser surface is constituted by a multi-section condenser of open tubular construction.

In a preferred embodiment of the invention, the evaporator and condenser surfaces are enclosed in a casing which is arranged to be evacuated to effect high-vacuum distillation.

According to another aspect of the invention, a method of distillation comprises the steps of supplying distilland to a rotatable evaporator surface which is symmetrical about its axis of rotation, rotating the evaporator surface to cause distilland to spread thereon in the form of a film, heating the evaporator surface to effect vaporization of the distilland, condensing distillate upon a stationary condenser surface disposed within and surrounded by the evaporator surface, the condenser surface comprising at least two sections in the direction of rotation of the evaporator surface, cooling the condenser surface to facilitate condensation of distillate thereon, the axis of rotation of the evaporator surface being inclined to the horizontal sufficient to cause distillation residue to travel under gravity toward the lower end of the evaporator surface, and guiding distillate condensed upon a section of the condenser surface under gravity to the region of the evaporator surface adjacent the next higher section of the condenser surface, thereby evaporating distillate at least twice and causing it to travel toward the higher end of the evaporator surface.

In order that the invention may be readily understood, reference is made to the drawing accompanying the provisional specification and to the accompanying drawings, in which:

Fig. 3 shows a vertical section of a third embodiment of the invention;

Fig. 4 shows a transaxial section on the line IV—IV of Fig. 3;

Fig. 5 shows a perspective view of a detail of the construction shown in Figs. 3 and 4;

Fg. 6 shows an elevational view of a particular form of condenser;

Fig. 7 shows a vertical section of another form of condenser;

Fig. 8 shows a sectional view of the separate parts of another form of condenser;

Fig. 9 shows a part-elevational, part-sectional view of a condenser made with the parts shown in Fig. 8;

Fig. 10 shows a longitudinal section of a further form of condenser;

Fig. 11 shows a cross-section on the line XI—XI of Fig. 10.

Figure 1:
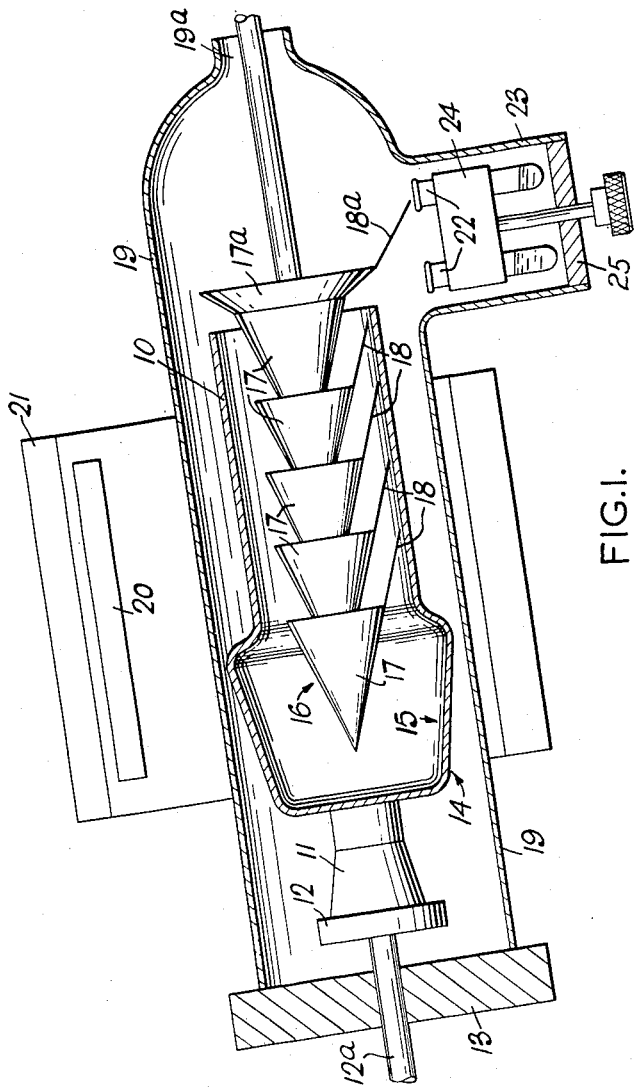
Fig. 1 shows a vertical section of one embodiment of distillation apparatus according to the invention.

Referring to Fig. 1, a tubular glass evaporator 10, having an inside diameter of 1¼" and a length of 5", is inclined at an angle of about 7°–8° to the horizontal. Its lower end is closed off and a glass pressed end 11 is fused on so as to be co-axial with the evaporator 10. The pressed end 11, is attached to a drive flange 12, which may be driven as by a shaft 12a to rotate the evaporator 10 about its long axis. The shaft 12a is mounted in an aperture formed in a vacuum-tight manner in a base plate 13 sealingly mounted upon the end of a glass vessel 19, described in core detail below.

The closed end of the evaporator 10 is expanded into a bulb 14 of truncated conical form, having a maximum diameter of about 2", and the cone angle of the bulb 14 is arranged to be about 15°, i.e. approximately twice the inclination of the axis of rotation of the evaporator 10 to the horizontal, so that the lowest part of the bulb 14 is approximately horizontal, as shown at 15.

A multi-stage aluminum condenser 16 is fixedly mounted inside and co-axial with the evaporator 10, the condenser 16 comprising an integral block machined to have the form of a number of water-cooled cones 17, each with a cone angle of about 30°, so that the surfaces of the cones 17 make an angle of about 15° with the axis of the system and the smaller end of each cone 17 is directed towards the lower, closed end of the evaporator 10. The highest cone 17 has a conical frustum 17a upon its base serving as a distillate delivery section of the condenser 16 and provided with a metal distillate guide tongue 18a. The delivery section 17a conveniently has a base diameter approximately the same as the adjacent end of the evaporator 10. Each condenser cone 17 has a metal tongue 18 on its lower surface, extending to the inside surface of the evaporator 10 and pointing towards the open upper end. Each tongue 18 extends upwardly of the system from the cone 17 to which it is attached by approximately the axial length of the next higher cone 17, so as to lead distillate from one cone 17 to the region of the surface of the evaporator 10 which is adjacent to the next higher cone 17.

The whole system is enclosed in the glass vessel 19, which can be evacuated by way of a neck portion 19a thereof. The vessel 19 has a downward extension 23 beneath the uppermost condenser cone 17 and end section 17a, which extension 23 is sealed off at 25 and contains a rotatable fraction collector 24 which carries a plurality of tubes 22 for receiving the separate distillate fractions. The desired number of tubes 22, e.g. ten, are provided in the collector 24 and each can be positioned in turn beneath the tongue 18a of the uppermost cone 17.

In practice, the distilland is introduced into the cone-shaped bulb 14 of the apparatus by means of a pipette. The glass evaporator 10 is rotated at about 150–250 r.p.m. and the system evacuated. A thin film of distilland is brought round the inner surface of the bulb 14 by the rotation and degassing takes place from it. At a speed such that the gravitational field at the periphery of the bulb 14 is somewhat greater than unity, for example, a speed over 200 r.p.m. in the case of a bulb 14 of approximately 2" diameter, foaming tends to be centrifugally suppressed and, after a few minutes, the evaporator 10 may be warmed with an infra-red emitter 20, which may be mounted inside or outside the evaporator 10, to complete the degassing operation. The requisite gravitational field to obtain centrifugal foam suppression can be derived from the equation:

$$F = 0.0000112 N^2 R$$

where F is gravitational field, N is revolutions per minute and R the internal radius of the bulb 14 in centimeters. In the example mentioned, $$F = 0.0000112 \times 40000 \times 2.539 = 1.025$$

The infra-red emitter 20, as shown in Fig. 1 of the drawing, is in a reflecting housing 21 and is arranged to heat the upper portion of the evaporator 10, so that the thin film of distilland receives more heat than the bulk of liquid at the bottom 15 of the bulb 14.

When the pressure is sufficiently low, the temperature is raised until distillation takes place on to the condenser 16 inside the bulb 14.

Distillate runs down the polished surface of the first condenser cone 17, down its metal tongue 18 and is led on to the cylindrical part of the evaporator tube 10 at a point opposite the next condenser cone 17.

From here, the distillate spreads as a thin cylindrical film and a portion of it re-distills to the second condenser cone 17, while the residue falls back into the bulb 14. In this fashion, the light fractions progressively travel upwardly to the open end of the evaporator 10, while the heavy fractions pass the other way in countercurrent flow towards the bulb 14. The final distillate undergoes five successive evaporations and is then collected in one of the tubes 22 held in the fraction collector 24. Six, eight or ten tubes 22, for example may be loaded in to the collector 24 at the beginning of the experiment and thus six, eight or ten successive fractions may be taken during the run.

Figure 2:
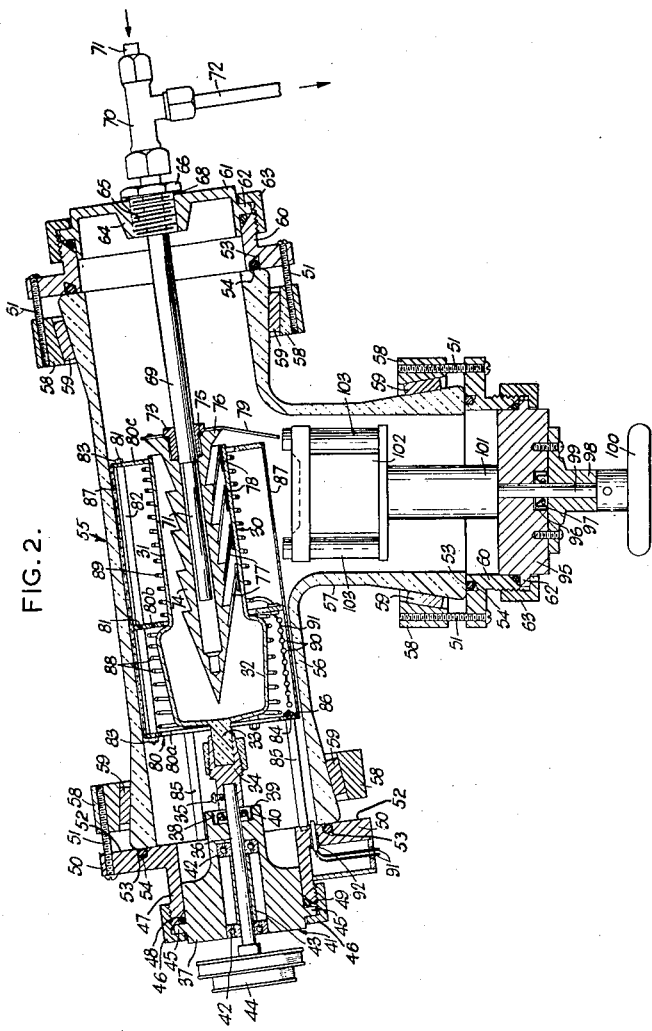
Fig. 2 shows a vertical section of another embodiment constructed on a similar basis to that shown in Fig. 1.

Referring to Fig. 2, which shows a larger-scale laboratory version of the distillation apparatus shown in Fig. 1, a tubular glass evaporator 30 is provided, having a section 31 of constant cross-section open at one end and integral at its other end with a bulb 32 of truncated conical shape. The cone angle of the bulb 32 is conveniently about 15°, as with the evaporator 10 shown in Fig. 1, and the evaporator 30 is also inclined with its axis at approximately 7½° to the horizontal. A glass spigot 33 is fused co-axially to the base of the bulb 32 and the evaporator 30 is mounted for rotation about its axis by the spigot 33 being secured in a chuck 34 mounted by means of a grub-screw 35 upon the end of a shaft 36. The shaft 36 is located for free rotation, but in a vacuum-tight manner, in a metal boss 37 having a well 38 co-axially within its inner face 39 in which a vacuum seal ring 40 is disposed. The boss 37 is counterbored from its outer face 41 and the shaft 36 is mounted in two ball bearings 42 disposed at opposite ends of the counterbore and spaced by means of a sleeve 43. A multiple pulley wheel 44 is secured to the exposed end of the shaft 36 and is adapted to be driven as by means of a belt drive from an electric motor (not shown), the belt being disposed upon the pulley appropriate to the desired rotational speed range of the evaporator 30.

An annular shoulder 45 is formed near the outer face 41 of the boss 37 for securing the latter in a vacuum-tight manner by means of a threaded ring 46 of L-shaped radial section to the end of a short wide metal tube 47. The end of the tube 47 abutting the shoulder 45 is chamfered to provide an annulus of triangular section within which a sealing ring 48 is disposed, so that it is compressed between the shoulder 45, the adjacent part of the external surface of the boss 37 and the chamfered end surface 49 of the tube 47. The tube 47 is integrally connected at its opposite end with a flange 50 drilled at spaced points round its periphery for receiving set screws 51 and having on its face 52 remote from the tube 47 an annular conically-based groove 53 in which a sealing ring 54 is located. The base assembly comprising the flanged tube 47 and the boss 37 is mounted over one end of a T-piece 55 of standard borosilicate glass pipeline comprising the casing of the distillation apparatus.

The T-piece 55 comprises a short straight length 56 of pipeline having a joint at each end and the side arm of the T-piece comprises a further length 57 of pipeline also having a joint at its open end. The side arm 57 has its axis at an angle of approximately 82½° from that of the straight portion 56 and is located in an off-centre position, so that when the straight portion 56 is arranged with its axis at approximately 7½° to the horizontal, the side arm 57 depends vertically therefrom and nearer the uppermost end of the straight portion 56. The flange 50 is secured to the standard joint at the lowermost end of the straight portion 56 of the T-piece 55 by means of a conventional, internally-coned ring 58 drilled and tapped to receive the set screws 51 in the flange 50 and spaced from the standard joint end by means of spacer members 59 of thermally insulating material. By this means, the evaporator 30 is mounted for rotation inside the straight portion of the T-piece 55 and accurately co-axial therewith. Preferably, the flange 50 and ring 58 are secured together by three of the set screws 51 which are equally spaced so as to lie at the vertices of an equilateral triangle. The three-point support of the flange 50 against the end of the standard joint so produced provides the necessary adjustability of the axis of the evaporator 30 relative to that of the straight portion 56 of the T-piece 55, since by adjustment of the individual set screws 51, the two axes can be made coincident while maintaining vacuum-tightness at the sealing ring 54.

By means of a similar coned ring 58, spacer members 59 and set screws 51, a flanged tube 60 having a sealing ring 54 in a cone-based groove 53 therein is fitted against the uppermost standard joint end of the straight portion 56 of the T-piece 55 and the outer end of the tube 60 is sealingly engaged with a cap member 61 by means of an integral annular shoulder 62 thereon and an internally threaded retaining ring 63. The cap member 61 has a central boss 64 which is apertured to receive a threaded plug 65 held in place by means of a lock nut 66 with an interposed sealing ring 68. The plug 65 has a co-axial tube 69 therein which is connected outside the casing to a T-piece union 70. The straight portion of the union 70 carries a central tube 71 which passes with clearance through the tube 69 and the side arm of the union 70 carries a further tube 72 which communicates with the space between the tubes 69 and 71. Within the casing, the tube 69 carries a welded collar member 73 sealingly carrying a multi-section condenser 74. The condenser 74 comprises an integral block of aluminium alloy machined to have the shape of a set of nested cones, with a larger cone 76 at one end to which the collar member 73 is secured with an interposed sealing ring 75. The condenser 74 is drilled axially from the end having the larger cone 76 almost to the apex of the opposite end and the tube 69 terminates at the collar member 73, whereas the tube 71 terminates near the end of the axial drilling in the condenser 74, so that cooling water or other coolant may be supplied via the tube 71 and removed via the tube 72.

Beneath the condenser 74 within a vertical axial plane therethrough, each conical section thereof carries a wire distillate guide 77 which preferably terminates in a wiper blade 78 arranged to lie parallel to the axis of the evaporator 30. The wiper blades 78 do not touch the inner surface of the evaporator 30, but are placed sufficiently close thereto as to form a film between them, when the still is in use, due to capillary forces, whereby distillate flowing down the guide tongues 77 runs on to the evaporator surface by capillary attraction and, where the guides 77 carry the wiper blades 78, becomes spread into a band upon the evaporator surface. A guide tongue 79 is secured to the lower point of the base periphery of the larger end cone section 76 of the condenser 74 to serve to guide the final distillate to a receiver, as explained below.

The evaporator 30 is surrounded by a stainless steel frame 80 which comprises three spaced rings 80a, 80b and 80c located approximately at the ends of the evaporator 30 and at the junction between the sections 31 and 32 thereof and joined by means of rods 81 with spacer tubes 82 between the plates, the rods having threaded ends receiving nuts 83. The framework 80 is mounted upon the flange 50 by means of further rods 84 carrying spacer tubes 85 and having threaded ends, one end of each rod 84 being secured in a threaded hole in the flange 50 and the other carrying a nut 86.

The framework 80 serves as a guide for centering the evaporator 30, a safety measure in case of breakage of the evaporator 30 and also a convenient means for supplying electric current to the heater and for supporting a hollow cylindrical reflector 87. The heater is in two parts, one shown at 88 comprising a self-supporting coil of "Nichrome" wire surrounding the bulb 32 of the evaporator 30 and the other shown at 89 comprising a second self-supporting coil of "Nichrome" wire surrounding the tubular section 31 of the evaporator 30. Current is supplied separately to the coils 88 and 89 by means of leads insulated by fish-spine beads 90, one such lead being shown at 91; the leads 91 enter the casing of the still via ceramic connectors 92 in the flange 50; the current return is provided by connecting the opposite end of each coil 88 or 89 to the framework 80.

The side arm 57 of the T-piece 55 is closed off in a manner similar to the upper end of the straight portion, but instead of the cap member 61 a thick plate 95 is used, which has a central well 96 in its outer surface in which a vacuum seal 97 is located. The plate 95 also carries on its outer surface a flange-ended sleeve 98 through which a shaft 99 passes, with its axis vertical. The lower end of the shaft 99 is secured to a handle or knob 100 by which the shaft 99 can be rotated. The upper end of the shaft 99, inside the T-piece side arm 57, is surrounded by a spacer sleeve 101 upon which rests a support cage 102 for receiving a plurality of test tubes 103 or other receivers for distillate. The test tubes 103 are spaced round a circle which lies beneath the end of the distillate guide tongue 79 from the end condenser section 76.

Referring to Figs. 3, 4 and 5, a modified embodiment of the distillation apparatus according to the invention is shown, which can be operated on a continuous basis.

The casing of the apparatus comprises standard pipeline members joined by conventional ring members. The casing includes a T-piece 110 (Fig. 3) having a straight portion 111, which may be dimensional, for example, so as to have a length of 12" and an internal diameter of 16", and a right-angled side arm 112, the length and internal diameter of which are both 6". The T-piece 110 is arranged to have its side arm 112 with its axis horizontal and is connected to a source of high vacuum by means not shown. The T-piece 110 has one end of its straight portion 111 secured by means of a conventional internally-coned ring 114, interposed insulating spacers 116 and set screws 118 to a metal base plate 120 and its other end is similarly secured to a main casing portion 121 (Figs. 3 and 4), comprising a length of 16" I.D. pipeline sealed off by a hemispherical end and having a length of, for example, 42". In this construction, all parts of the distillation apparatus inside the casing are mounted directly or indirectly on the base plate 120.

The evaporator in the embodiment shown in Figs. 3, 4 and 5 comprises a near-horizontal, cylindrical tube 122, preferably of borosilicate glass, which is open at both ends, having an internal diameter of 8" and a length of 32". A drive shaft 123 (Figs. 3, 4 and 5) for rotating the evaporator 122 is mounted in a vacuum-tight, but manually rotatable gland member 125 (Fig. 3) secured to the base plate 120 so that the axis of the shaft 123 is parallel to that of the evaporator 122, which is co-axial with the casing 121. The shaft 123 lies outside the evaporator 122 and extends from the base plate 120 to the further end of the evaporator 122. The shaft 123 is encased from the base plate 120 for approximately the length of the T-piece section 111 in a guide tube 126 (Figs. 3 and 5) which houses spaced ball bearings for the shaft 123 and a vacuum seal (not shown). At its free end, the tube 126 carries a collar 127 which has an integral arm 128 terminating in a further collar 129, the arm 128 depending at an angle so that the collar 129 lies with its axis in a vertical plane through the axis of the evaporator 122. A tube 130 is carried by the collar 129 and extends beneath the evaporator 122. At positions adjacent each end of the evaporator 122, a V-shaped support member comprising a collar 131 and a pair of divergent arms 132 is secured to the tube 130, the arms 132 being dimensioned so that the arm 132 on one side of each support member provides a further bearing point for the drive shaft 123. The arms 132 on the other side carry short shafts 134 (Fig. 5) which carry idle rollers 135 on their ends upon which the evaporator 122 rests. Further rollers 136 are drivingly mounted upon the shaft 123, so that the evaporator 122 rests upon the four rollers 135 and 136 and is driven by the two latter.

The condenser in the embodiment shown in Figs. 3, 4 and 5 is similar to those shown in Fig. 1 and Fig. 2, but differs essentially in that it is mounted from the base plate 120 by means of water feed tubes which pass into the apex end of the condenser. The latter comprises a turned aluminium block 140 having the shape of eight similar nested cones drilled axially as at 141 from the smaller face of the cone nearest the base plate 120 almost to its other end. The open end of the drilling 141 receives a tube 142 which is mounted in a plug 144 threaded into an aperture 145 in the centre of the base plate 120. A T-piece union 146 is secured to the tube 142 outside the base plate 120 and a central water feed tube 147 passes through it almost to the end of the drilling 141. A water outlet tube 148 forms the side arm of the union 146 and communicates with the annular space between the tubes 142 and 148.

The underside of each cone section of the condenser 140 except that furthest from the base plate 120 carries a distillate guide channel 149 secured by studs 150 and the cone angle is such that the channels 149 are directed downwards in opposition to the inclination of the still so that distillate condensing on one cone section is returned to the evaporator 122 at a point opposite the next cone section, whereby the distillate undergoes eight cycles of evaporation and condensation. The base of the last cone section has an integral threaded boss 151 upon which an end section 152 of the condenser is screwed, serving as a distillate delivery section. The end section 152 has an integral distillate delivery flange 152 of greater diameter than the evaporator 122, the lower part of which is surrounded by an arcuate gutter 155 which delivers distillate to a take-off tube 156 which passes through the base plate 120 to an evacuated receiver (not shown). A residue gutter 157 is located beneath the opposite, i.e. lower, end of the evaporator 122 and leads to a residue take-off tube 158 which likewise passes through the base plate 122 to an evacuated receiver (not shown).

It is advisable to provide means for preventing axial movement of the evaporator 122, due to its inclination to the horizontal, and also to provide means for trapping any residue carried up by the rising part of the residual delivery end of the evaporator 122. To prevent axial shifting of the evaporator 122, the gutter 157 is carried upwardly in a semi-circular shape at either side of the evaporator 122 and a roller 159 with its axis normal to that of the evaporator 122, e.g. a horizontal axis, is housed in each upward end of the gutter 157 so as to bear against the end of the evaporator 122 and prevent its axial shifting. The gutter 157 is enlarged at 160 to house each roller 159 and collect the residue sprayed therefrom. Axial shifting of the evaporator can also be prevented by other means; for example, an annular collar member can be provided around the lower end of the evaporator 122 and spaced a distance therefrom sufficient for one or more rollers, with their axes normal to the axis of the evaporator 122, to bear against the lower side face of the collar member between the latter and the end of the evaporator 122. One such roller could be provided above the evaporator with its axis in the vertical median plane therethrough and inclined to the vertical by the same amount as the inclination of the evaporator axis to the horizontal. The rollers or other means forming a stop for the evaporator 122 could be mounted upon arms carried by the guide tube 126.

Distilland is fed to the inside of the evaporator 122 via a pipe 161 telescopically mounted in the base plate 120 so that the point of delivery of distilland can be moved as desired relative to the evaporator 122, as indicated in dotted lines in Fig. 3.

The evaporator 122 is heated by means of one or more electric heating coils 162, which may be of "Nichrome" wire covered with "Pyrotenax" material, which coil or coils 162 is or are located around the evaporator 122. Preferably, four coils 162 are provided so that each acts upon the portion of the evaporator 122 which corresponds to two cone sections of the condenser 140. The coils 162 are separately energised and mounted by their leads in vacuum-tight plugs 163 located in apertures in the base plate 120, two of the four plugs 163 being shown in Fig. 3. The space above the coils 162 houses a polished metal reflector 164 of arcuate section.

It is often found desirable, particularly with distillands which have a very high boiling or otherwise viscous residue, to accelerate its removal from the evaporator and this may be achieved by providing one or more slotted wiper blades 165 inside the evaporator 122, so as to contact the surface at the bottom opposite the first two condenser cones, for example. With the drive shaft 123 rotated as shown in Figs. 4 and 5 and with consequent clockwise rotation of the evaporator 122 as seen in Fig. 4, the slots 166 in the wiper blade 165 (which is held stationary by any suitable means, not shown) extend rearwardly and to the left as viewed in Fig. 3.

Fig. 6 shows a modified form of condenser which can be used instead of the nested cone type illustrated in Figs. 1 to 4. The condenser comprises a right cylinder 170 of aluminium alloy drilled axially from one end as at 171 and provided with a water inlet pipe 172 and a water outlet pipe 173 by which the condenser may be mounted as described above. At the other end, a flanged cone section 174 is provided. The condenser is divided by integral annular ribs 175 into, for example, 6 sections 176 and the undersides of each rib 175 and of each section 176 are removed as by milling, as indicated at 177 and 178 respectively. The surfaces 178 are part-conical and the cone angle is arranged so that the distillate from one section 176 is guided by a wire or channel (not shown) to the evaporator surface opposite the next section 176, as described above for instance in relation to the condenser 140 shown in Fig. 3.

Another form of condenser section is shown in Fig. 7. This comprises a truncated cone of open tubular construction and comprises a closed, preferably circular, loop or tube 180 provided with a water inlet pipe 181, another closed circular loop or tube 182 of larger diameter provided with a water outlet pipe 183 and a plurality of straight connecting tubes 184 arranged to define a conical plane, so that the condenser section resembles a right conical frustum. Several of such units may be joined together by their water inlet and outlet pipes, and possibly strut or like members, to form a multi-section condenser.

Figs. 8 and 9 show a similar multi-section condenser of open construction consisting of a number of standard intermediate and end members of simpler construction. Each intermediate section 190 comprises two rings 191 and 192 of the same internal and external diameters, the bases of the rings 191 and 192 facing each other. The ring 191 is of channel form in radial section and includes integral inner and outer flanges 193 and 194. The ring 192 is also of channel form in radial section and includes integral inner and outer flanges 195 and 196, the latter and the ring 192 itself being deeper than the corresponding flanges 193 and 194 and the ring 191. The flanges 195 and 196 include circular grooves of triangular section which house sealing rings 197 for sealing the ring 192 to the ring 191 of an adjacent member of the condenser. The rings 191 and 192 are joined by a plurality of tubes 198 which are arranged in the form of a cone, being joined to the ring 191 near the outside flange 194 and to the ring 192 near the inside flange 195. In the example illustrated, the rings 191 and 192 are joined by twelve tubes 198, though more or less could be provided if desired. A number of intermediate sections equal to the number of sections, e.g. eight, desired in the condenser are joined together as by means of bolts located in holes drilled through the flanges 193–196 at points in register. The condenser is completed by a water inlet end section 199, comprising a ring 200 similar to the ring 191 but provided only with a water inlet tube 201, and a water outlet end section 202, comprising a ring 203 similar to the ring 192 but provided only with a water outlet tube 204.

Multi-section condensers of the kinds illustrated in Fig. 7 and Figs. 8 and 9 have the advantage, due to their open construction, of giving improved pumping efficiency in the system as compared with condensers of the kinds illustrated in Figs. 1 to 6.

Referring to Figs. 10 and 11, a further form of condenser is shown in which the condenser block, shown at 210, has a simple shape and, in the particular embodiment illustrated, consists of a metal block of right cylindrical shape. The block 210 has an axial aperture 211 extending from one end almost to the other and the open end of the aperture 211 is internally threaded at 212. The thread 212 receives a threaded flanged plug 213, the flange of which contacts a vacuum seal ring 214. The plug 213 has welded in an axial aperture therein a water outlet tube 215 which terminates within the block 210 at or slightly beyond the inner end of the plug 213, and a water inlet tube 216 is disposed concentrically within the tube 215 and extends almost to the other end of the aperture 211 in the block 210. In order to divide the condenser surface, which is constituted by the outside surface of the block 210, into two or more sections, an annular plate 217 is secured as by set screws 218 to the end of the block 210 adjacent the plug 213 and surrounding the flanged portion thereof. This plate 217 has a diameter greater than that of the condenser block 210 and has secured to its periphery as by welding a wide distillate gutter 219 of arcuate cross-section, which extends the length of the block 210 slightly spaced therefrom. At spaced intervals, partition walls 220 of arcuate shape are welded to the gutter 219 and shaped to occupy the arcuate space between it and the condenser surface, whereby the latter is divided into a number of sections. The condenser is positioned so that the gutter is bisected by a vertical plane through the condenser axis and, at the lowermost point of each section of the gutter 219 sectioned off by the partitions 220 a distillate delivery tube 221 is welded into an aperture provided in the gutter 219. Each tube 221 lies within the aforementioned vertical plane and has an inclination such that distillate collecting in one section of the gutter 219 is delivered by the tube 221 to the evaporator surface (shown at 223) approximately beneath the higher partition 220 defining the next higher section of the condenser. The uppermost section of the condenser has a final distillate delivery tube 222 which leads to a receiver (not shown).

The condenser shown in Figs. 10 and 11 may be modified as desired. For example, the arcuate partitions 220 may be replaced by fully annular members which encircle the block 210 and divide its whole surface into sections.

With a molecular distillation apparatus of the kind described, the thermal hazard is reasonably low and fractionation of the distilland occurs, as demonstrated by the change in colour of the distillates along the row of condenser cones.

The separatory power is governed partly by the reflux ratio and, in the relatively simple and small-scale apparatus described in relation to Fig. 1, this can readily be controlled by sliding the heater 20 from side to side in order to vary the heat distribution from the primary evaporator to the fractionating section. In a more elaborate construction, suitable for large-scale laboratory and pilot-plant work, such as those illustrated in Fig. 2 and Figs. 3 to 5, separate heaters are conveniently used. With the heater in the normal middle position, the overall reflux ratio is about 10:1. A continuously-operable still such as described above in relation to Figs. 3 to 5 is useful for molecular distillation of rather volatile materials such as methyl esters, where the finest conditions are not necessary but where molecular fractionation can contribute to a saving in process time in re-cycling distillands.

It will be appreciated by those skilled in the art that the apparatus of the invention requires no accurately machined parts, as the evaporator can merely be a standard length of large-bore glass pipeline, and has very little centrifugal stress to withstand.

I claim:

1. A distillation apparatus which comprises, in combination, a rotatable evaporator surface which is symmetrical about its axis of rotation, means for rotating the evaporator surface, means for heating the evaporator surface, a stationary condenser surface disposed within and surrounded by the evaporator surface, the condenser surface comprising at least two sections in the direction of the axis of rotation of the evaporator surface, means for cooling the condenser surface and the axis of rotation of the evaporator surface having an inclination to the horizontal sufficient to cause distillation residue to travel under gravity toward the lower end of the evaporator surface, means being associated with each section of the condenser surface to cause distillate condensed on such section to be delivered under gravity to the region of the evaporator surface adjacent the next higher section of the condenser surface, whereby the distillate is evaporated at least twice and is caused to travel toward the higher end of the evaporator surface.

2. A distillation apparatus which comprises, in combination, a rotatable evaporator surface formed by a near-horizontal tube, the lower end of the tube being closed to serve as a receptacle for distilland and the tube being symmetrical about its axis of rotation, means for rotating the evaporator surface, means for heating the evaporator surface, a stationary condenser surface disposed within and surrounded by the evaporator surface, the condenser surface comprising at least two sections in the direction of the axis of rotation of the evaporator surface, means for cooling the condenser surface and the axis of rotation of the evaporator surface having an inclination to the horizontal sufficient to cause distillation residue to travel under gravity toward the lower end of the evaporator surface, means being associated with each section of the condenser surface to cause distillate condensed on such section to be delivered under gravity to the region of the evaporator surface adjacent the next higher section of the condenser surface, whereby the distillate is evaporated at least twice and is caused to travel toward the higher end of the evaporator surface.

3. The distillation apparatus of claim 2, wherein the lower end of the tube comprises a bulb of truncated conical form, having a cone angle approximately twice the angle of inclination of the axis of rotation, whereby the lowermost portion of the bulb surface is approximately horizontal.

4. A distillation apparatus which comprises, in combination, a rotatable evaporator surface formed by a near-horizontal tube open at both ends, means for rotating the evaporator surface, means for heating the evaporator surface, a stationary condenser surface disposed within and surrounded by the evaporator surface, the condenser surface comprising at least two sections in the direction of the axis of rotation of the evaporator surface, means for cooling the condenser surface and the axis of rotation of the evaporator surface having an inclination to the horizontal sufficient to cause distillation residue to travel under gravity toward the lower end of the evaporator surface, means being associated with each section of the condenser surface to cause distillate condensed on such section to be delivered under gravity to the region of the evaporator surface adjacent the next higher section of the condenser surface, whereby the distillate is evaporated at least twice and is caused to travel toward the higher end of the evaporator surface.

5. The distillation apparatus of claim 2, wherein the means for rotating the evaporator surface comprise a drive shaft located parallel to and outside the axis of the open-ended tube, spaced driving rollers carried upon the drive shaft for supporting and driving the tube, a support member extending beneath and parallel to the tube, spaced double-armed supports carried by the support member, one arm of each support providing a bearing point for the drive shaft adjacent one of the driving rollers thereon, the other arm of each support carrying an idle roller for supporting the tube in conjunction with the driving rollers, a supporting tube for supporting the driving means, spaced bearings housed in the supporting tube for rotationally supporting the drive shaft and a rigid arm secured at one end to the supporting tube and at the other end to the support member.

6. A distillation apparatus which comprises, in combination, a rotatable evaporator surface constituted by a near-horizontal evaporator tube which is symmetrical about its axis of rotation and is open at least at its upper end, means for rotating the evaporator tube, means for heating the evaporator tube, a stationary condenser surface disposed within and co-axially surrounded by the evaporator tube, the condenser surface being constituted by an integral block comprising a plurality of sections in the direction of the axis of rotation of the evaporator tube, each section of the condenser block thereby being disposed adjacent a corresponding region of the evaporator tube, means for cooling the condenser block, the axis of rotation of the evaporator tube having an inclination to the horizontal which is sufficient to cause distillation residue to travel under gravity toward the lower end of the evaporator tube, and distillate guide means associated with each section of the condenser block to cause distillate condensed upon a section of the condenser block to be guided under gravity by the guide means to the region of the evaporator tube adjacent the next higher section of the condenser block, whereby the distillate is evaporated a number of times equal to the number of sections of the condenser block and is caused to travel toward the upper end of the evaporator tube.

7. The distillation apparatus of claim 6, wherein the condenser block has the form of a plurality of nested cones having their apices directed toward the lower end of the evaporator tube and their bases directed toward the upper end of the evaporator tube, the distillate guide means comprising guide tongues extending from the lowest part of the base of a condenser cone toward the region of the evaporator tube adjacent the next higher condenser cone.

8. The distillation apparatus of claim 6, wherein the condenser block has the form of a plurality of axially-extending cylindrical sections each defined by having a part-conical lower surface diverging in the direction toward the upper end of the evaporator tube, the distillate guide means comprising guide tongues extending from the lowest part of the part-conical surface of a cylindrical condenser section toward the region of the evaporator tube adjacent the next higher condenser section.

9. The distillation apparatus of claim 7, wherein each guide tongue terminates in a wiper member disposed parallel to the axis of rotation of the evaporator tube and at a capillary distance from the surface of the evaporator tube, the rotation of the evaporator tube thereby causing distillate delivered by a guide tongue to a region of the evaporator tube from the condenser cone adjacent the next lower region to be spread by the wiper member into a band upon the region of the evaporator tube.

10. A distillation apparatus which comprises, in combination, a rotatable evaporator surface constituted by a near-horizontal evaporator tube which is symmetrical about its axis of rotation and is open at least at its upper end, means for rotating the evaporator tube, means for heating the evaporator tube, a stationary condenser surface disposed within and co-axially surrounded by the evaporator tube, the condenser surface being constituted by a condenser of open tubular construction comprising a plurality of sections in the direction of the axis of rotation of the evaporator tube, each section of the condenser block thereby being disposed adjacent a corresponding region of the evaporator tube, means for cooling the condenser block, the axis of rotation of the evaporator tube having an inclination to the horizontal which is sufficient to cause distillation residue to travel under gravity toward the lower end of the evaporator tube, and distillate guide means associated with each section of the condenser block to cause distillate condensed upon a section of the condenser block to be guided under gravity by one of the guide means to the region of the evaporator tube adjacent the next higher section of the condenser block, whereby the distillate is evaporated a number of times equal to the number of sections of the condenser block and is caused to travel toward the upper end of the evaporator tube.

11. The distillation apparatus of claim 10, wherein each section of the open tubular construction condenser comprises a first closed tubular loop, a second and larger tubular loop spaced upwardly from the first loop in the direction of the axis of rotation of the evaporator tube, a plurality of tubes joining the first loop to the second loop, the first and second loops intercommunicating by way of the tubes, a coolant inlet communicating with one of the loops and a coolant outlet communicating with the other of the loops, whereby coolant supplied to the coolant inlet passes into the associated loop, through the tubes, into the other loop and out of the coolant outlet.

12. The distillation apparatus of claim 10, wherein each section of the open tubular construction condenser comprises a first ring of channel-shaped radial section, a second ring of channel-shaped radial section spaced from the first ring in the direction of the axis of rotation of the evaporator tube, the first and second rings having similar internal and external diameters and the bases of their channels facing one another, a plurality of tubes joining the base of the first ring to the base of the second ring, the channel of one ring intercommunicating with the channel of the other ring by way of the tubes, the first ring having annular flanges for mating with corresponding flanges of the second ring of the adjacent section at one side and the second ring having annular flanges for mating with corresponding flanges of the first ring of the adjacent section at the other side.

13. The distillation apparatus of claim 12, wherein the condenser includes end sections for association with the terminal rings of the sections, each end section comprising a ring of channel-shaped radial section having flanges for mating with the flanges of the terminal rings, one end section carrying a coolant inlet for introducing coolant into the condenser and the other end section carrying a coolant outlet for withdrawing coolant from the condenser.

14. A distillation apparatus for effecting high-vacuum distillation, comprising an evacuable casing, a rotatable evaporator surface constituted by a near-horizontal evaporator tube disposed within the casing, the evaporator tube being symmetrical about its axis of rotation and being open at least at its upper end, means housed in the casing for rotating the evaporator tube, means in the casing for heating the evaporator tube, a stationary condenser surface disposed within and co-axially surrounded by the evaporator tube, the condenser surface comprising a condenser block divided into a plurality of sections in the direction of the axis of rotation of the evaporator tube, each section of the condenser block thereby being disposed adjacent a corresponding region of the evaporator tube, means for cooling the condenser block, the axis of rotation of the evaporator tube having an inclination to the horizontal which is sufficient to cause distillation residue to travel under gravity toward the lower end of the evaporator tube, and distillate guide means associated with each section of the condenser block to cause distillate condensed upon a section of the condenser block to be guided under gravity by the guide means to the region of the evaporator tube adjacent the next higher section of the condenser block, whereby the distillate is evaporated a number of times equal to the number of sections of the condenser block and is caused to travel toward the upper end of the evaporator tube.

15. The distillation apparatus of claim 14, wherein the casing comprises a tubular T-piece comprising a straight part housing the condenser surface and evaporator surface and a dependent side arm located beneath the highest section of the condenser, a rotatable fraction collector carrying a plurality of receptacles for receiving separate distillate fractions being housed in the side arm.

16. The distillation apparatus of claim 14, wherein the casing comprises a tube closed at one end and open at the other end, a T-piece having its straight part extending from the open end of the tube and its side arm connected to a source of vacuum, the end of the straight part remote from the tube being closed by a base plate and all parts inside the casing being supported from the base plate.

17. A method of distillation, which comprises the steps of supplying distilland to a rotatable evaporator surface which is symmetrical about its axis of rotation, rotating the evaporator surface to cause distilland to spread thereon in the form of a film, heating the evaporator surface to effect vaporization of the distilland, condensing distillate upon a stationary condenser surface disposed within and surrounded by the evaporator surface, the condenser surface comprising at least two sections in the direction of rotation of the evaporator surface, cooling the condenser surface to facilitate condensation of distillate thereon, the axis of rotation of the evaporator surface being inclined to the horizontal sufficient to cause distillation residue to travel under gravity toward the lower end of the evaporator surface, and guiding distillate condensed upon a section of the condenser surface under gravity to the region of the evaporator surface adjacent the next higher section of the condenser surface, thereby evaporating distillate at least twice and causing it to travel toward the higher end of the evaporator surface.

References Cited in the file of this patent

UNITED STATES PATENTS

| 2,406,421 | Wollner | Aug. 27, 1946 |
| 2,446,997 | Brewer et al. | Aug. 17, 1948 |
| 2,562,153 | Taylor | July 24, 1951 |
| 2,575,690 | Smith | Nov. 20, 1951 |
| 2,695,871 | Shavel et al. | Nov. 30, 1954 |
| 2,749,292 | Perry et al. | June 5, 1956 |